H. MORITZ.
CLOTH STEAMING MACHINE.
APPLICATION FILED FEB. 6, 1912.
1,047,683.
Patented Dec. 17, 1912.
2 SHEETS—SHEET 2.
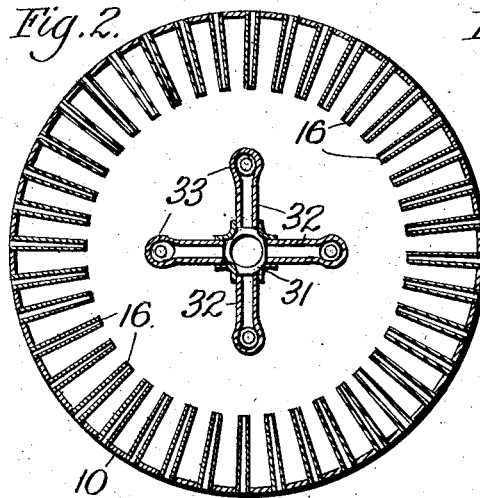
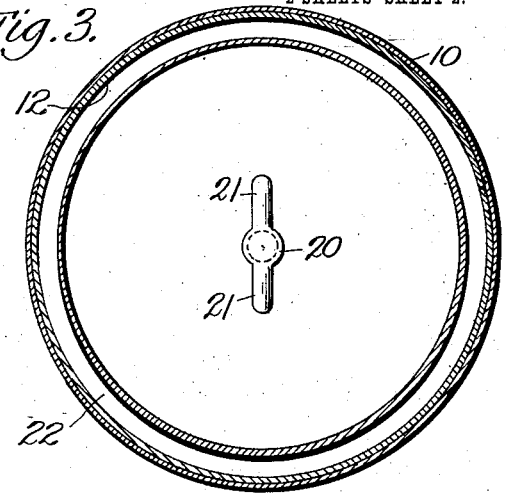
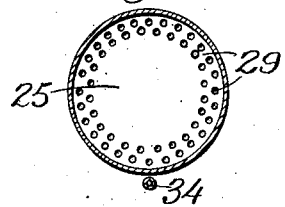
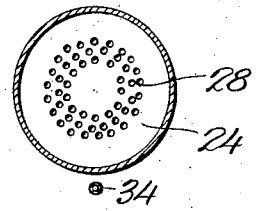
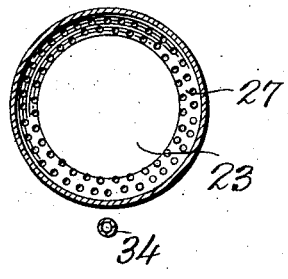
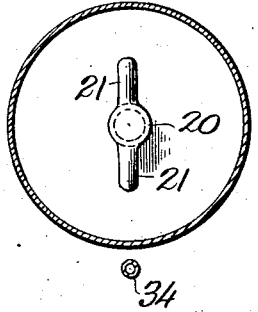
WITNESSES
INVENTOR,
Herman Moritz,
BY
ATTORNEY

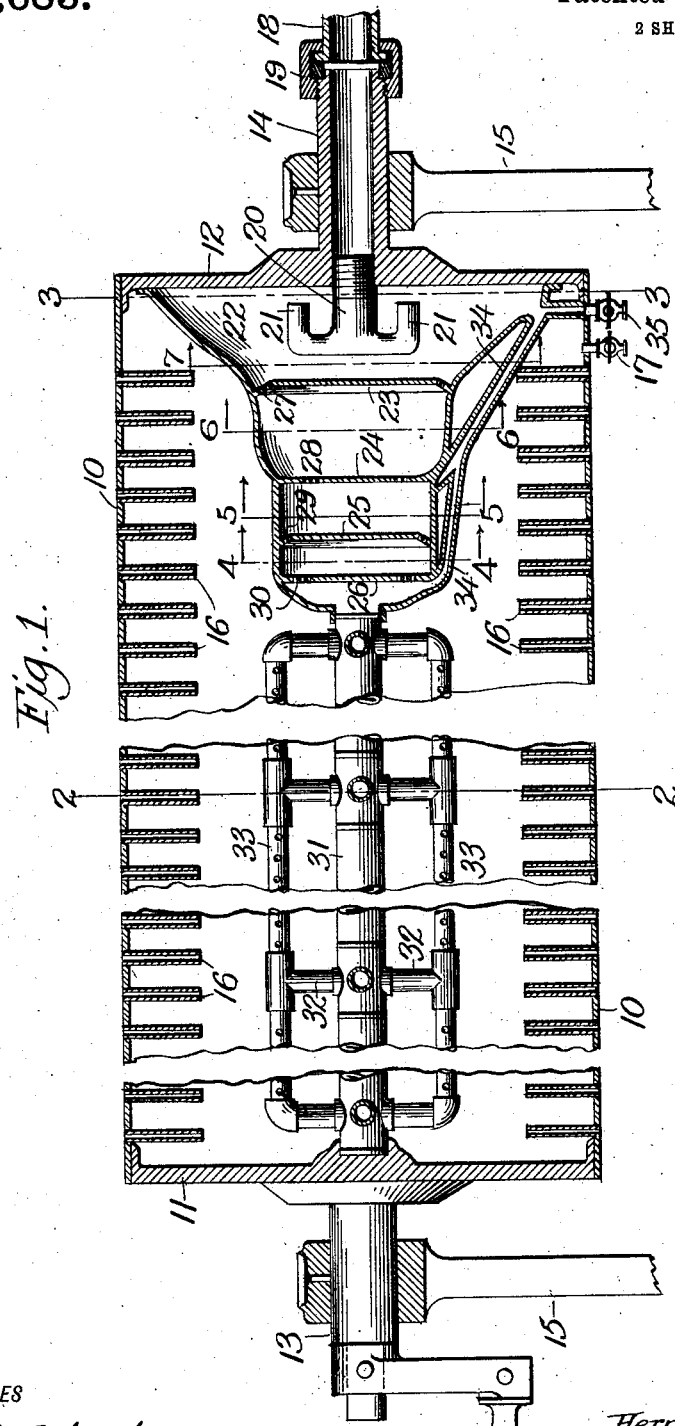

UNITED STATES PATENT OFFICE.

HERMAN MORITZ, OF NEW YORK, N. Y.

CLOTH-STEAMING MACHINE.

1,047,683.  Specification of Letters Patent.  Patented Dec. 17, 1912.

Application filed February 6, 1912. Serial No. 675,791.

*To all whom it may concern:*

Be it known that I, HERMAN MORITZ, a citizen of the United States, residing at New York, in the county of New York and State of New York, have invented new and useful Improvements in Cloth-Steaming Machines, of which the following is a specification.

This invention relates to machines for steaming cloth and its object is to provide live steam, to deliver same into a hollow cylinder, reduce the pressure and finally deliver the steam through openings upon the surface of the cloth itself as will be more fully described in the following specification, set forth in the claims and illustrated in the drawings, wherein,—

Figure 1 is a longitudinal sectional view of the cylinder used in steaming cloth. Fig. 2 is a section on the line 2—2. Fig. 3 is a sectional view on the line 3—3. Fig. 4 is a similar section on the line 4—4. Fig. 5 is a sectional view on the line 5—5. Fig. 6 is a similar view on the line 6—6. Fig. 7 is a sectional view on the line 7—7.

The device consists of a cylinder 10 of sheet metal having heads 11 and 12, the former having secured to it the trunnion 13, while the head 12 is provided with a hollow trunnion 14, both being mounted in bearings 15, supported in any desired manner. The entire surface of the cylinder 10 is provided with inwardly projecting tubes 16 which afford openings for the escape of steam when the cloth is wound upon a cylinder to be operated on and at the same time to prevent the escape of water resulting from the condensation of the steam but which may be drawn off through the cock 17 at one side of the cylinder.

The steam is introduced through the pipe 18, connected with the hollow trunnion by means of the swiveled coupling 19 which permits of the rotation of the trunnion, while the pipe 18 is stationary. Projecting inward from the trunnion 14 is a pipe 20 having branches 21 which are steam outlets and which deliver the steam against the head 12 so as to break its force and yet deliver it within a chamber 22, forming a compartment within a sheet metal vessel through which the steam passes. This vessel is divided by means of partitions 23, 24, 25, and 26, all having perforations and dividing compartments through which the steam passes. The perforations 27 of the partition 23 are offset from the perforations 28 of the partition 24, while perforations 29 and 30 of the other two partitions are also out of line so that the steam has no chance to pass directly through the vessel but is obstructed by these baffle-plates which causes the water to fall and drain off and deliver the steam to a central pipe 31 with very little water remaining.

The pipe 31 is made of sections and is provided with radial pipes 32, carrying perforated pipes 33 which are parallel with the pipe 31 and are adapted to deliver the steam into the cylinder so that it may escape through the tubes 16. The various compartments above mentioned are drained by means of a pipe 34 which delivers the condensed water to a cock 35 by which it may be drawn off and the location of the perforations are such that the water is permitted to drain off before it reaches such a height that it will enter the pipe 31 and mix same with the steam. During the period that the steam is turned on, the cocks 17 and 35 are closed and are not opened until there is a sufficient amount of condensed liquid to render same necessary.

It is obvious that the parts may be otherwise arranged or modified without departing from the essential features above described and without departing from the scope of the appended claims.

What I claim as new and desire to secure by Letters Patent is;—

1. In a cloth steamer, the combination with a cylinder, of interior outlet tubes within the same, a steam inlet tube forming a trunnion, return branches for the inlet tube, a receptacle with bafflers and an outlet, a supply pipe connected with the receptacle and supported by the other end of the cylinder, and parallel and radial pipes composed of T couplings and elbows and connected with the supply pipe.

2. In a cloth steamer, the combination with a cylinder having a series of inwardly projecting tubes, of a hollow trunnion at one end, a pipe with return branches connected with the opening in the trunnion, a vessel within that end of the cylinder, partitions within the vessel and having staggered perforations, pipes for draining the vessel, a pipe connected with the vessel and running the length of the cylinder, radial pipes branching from same and parallel perforated pipes carried by the radial pipes and connected with the pipe from the vessel.

In testimony whereof I affix my signature in presence of two witnesses.

HERMAN MORITZ.

Witnesses:
 BENJAMIN GLAXON,
 HUGO WALDVOGEL.